(12) United States Patent
Esterson et al.

(10) Patent No.: US 6,328,083 B1
(45) Date of Patent: Dec. 11, 2001

(54) BARBEQUE GRILL COVER

(75) Inventors: Robin Esterson, New York, NY (US); Kristie M. Killen, Lighthouse Point, FL (US); Donald R. Lamond, Lynbrook, NY (US); Dylan Akinrele, Brooklyn, NY (US); Anna Stern, New York, NY (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/374,418

(22) Filed: Aug. 13, 1999

(51) Int. Cl.[7] .................................................. B65D 65/00
(52) U.S. Cl. .......................................... 150/154; 150/165
(58) Field of Search ..................... 150/154, 157, 150/158, 164, 165, 166, 901; 383/127; 296/136; 38/140; 206/576, 320

(56) References Cited

U.S. PATENT DOCUMENTS

| | | | |
|---|---|---|---|
| D. 377,136 | * | 1/1997 | Knuth ........................... D7/402 |
| 1,715,286 | * | 5/1929 | Hardy ........................... 150/166 |
| 2,243,981 | * | 6/1941 | Rowan ........................... 150/166 |
| 2,570,533 | * | 10/1951 | Elliott ........................... 150/166 |
| 2,646,097 | * | 7/1953 | Graverth et al. ............... 150/166 |
| 2,803,282 | * | 8/1957 | Wilcox ........................... 150/166 |
| 2,871,590 | * | 2/1959 | Delander ........................ 38/140 |
| 2,999,325 | * | 9/1961 | Munson et al. ................. 38/140 |
| 3,007,267 | * | 11/1961 | Goldsmith ..................... 38/140 |
| 3,049,826 | * | 8/1962 | Goldsmith ..................... 38/140 |
| 3,603,011 | * | 9/1971 | Cohen ........................... 38/140 |
| 4,634,618 | * | 1/1987 | Greer et al. ................. 383/127 X |
| 4,795,207 | * | 1/1989 | Clarke ........................... 150/166 |
| 5,167,267 | * | 12/1992 | McQuaid ....................... 150/166 |
| 5,209,545 | * | 5/1993 | Slaugh ........................... 296/136 |
| 5,231,777 | * | 8/1993 | Mattesky et al. ............... 38/140 |
| 5,405,002 | * | 4/1995 | Troia ........................... 206/315.15 |
| 5,429,406 | * | 7/1995 | Huang ........................... 296/95.1 |
| 5,518,289 | * | 5/1996 | Cobble ........................... 296/136 |
| 5,597,197 | * | 1/1997 | Morwar et al. ................. 296/136 |
| 5,915,399 | * | 1/1999 | Yang ........................... 135/88.01 |
| 6,058,658 | * | 5/2000 | Dunn ........................... 52/23 |

* cited by examiner

Primary Examiner—Gene Mancene
Assistant Examiner—Joseph C Merek
(74) Attorney, Agent, or Firm—Kramer Levin Naftalis & Frankel LLP

(57) ABSTRACT

A grill cover assembly having a generally rectangular main body, a tapered left side portion, attached to the left edge of the main body, a tapered right side portion, attached to a right edge of the main body, and a generally square pocket piece attached to the left side portion. The grill cover provides lightweight and portable protection for a barbecue-type grill. The grill cover assembly can fold into its own built-in pocket for easy and convenient storage.

13 Claims, 1 Drawing Sheet

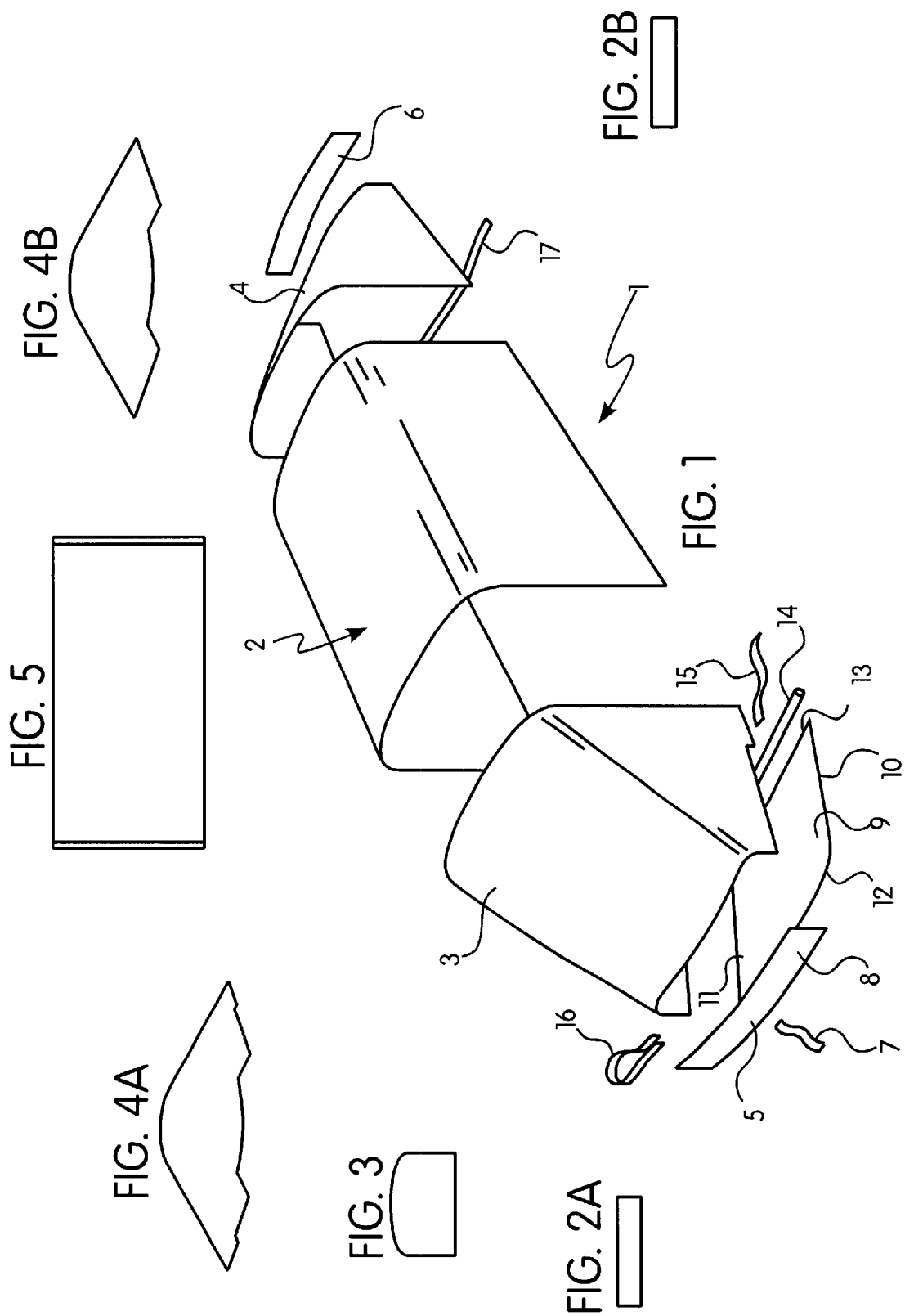

BARBEQUE GRILL COVER

FIELD OF THE INVENTION

The present invention relates to covers, and in particular, to covers for barbecue grills.

BACKGROUND INFORMATION

The popularity of outdoor barbecue grills has led to an increased need to provide protection for such grills. Outdoor barbecue grills can be quite expensive and an unprotected grill soon loses its attractive, new appearance. In addition, the functionality of an unprotected grill may be compromised.

In general, several examples of covers for outdoor barbecue grills are known. Each of these existing covers, however, has significant disadvantages. For example, wooden covers are heavy, cumbersome, and often unattractive. When the grill is in use, a wooden cover must be removed and placed in a location so as not to interfere with the operator of the grill. A wooden cover when not in use takes up space which, if available at all, could otherwise be used for better purposes.

Conventional canvas covers also have deficiencies. Canvas covers are often unattractive, can be blown off a grill by high winds leaving the grill unprotected, and also must be stored when the grill is in use. Removal, folding, and storage of a conventional canvas cover can be a time-consuming and inconvenient exercise especially in cold temperatures and in wet conditions.

SUMMARY OF THE INVENTION

The present invention provides a grill cover which can be easily removed, folded into itself, and stored when the grill is to be in use. The present invention also provides a grill cover which can be easily unfolded and placed on a grill.

It is an object of the present invention to provide a grill cover which is flexible, easily removed, foldable into itself, and easily stored. It is a further object of the present invention to provide a grill cover which can be easily unfolded and placed on a grill.

It is a further object of the present invention to provide a grill cover which sheds water and is pliable even in cold conditions.

BRIEF DESCRIPTION OF THE DRAWINGS

FIG. 1 is an exploded perspective view of an exemplary embodiment a grill cover in accordance with the present invention.

FIGS. 2A and 2B are plan views of an unfolded left and right end panel, respectively.

FIG. 3 is a plan view of an unfolded pocket piece.

FIGS. 4A and 4B are plan views of an unfolded left and right side panel, respectively.

FIG. 5 is a plan view of an unfolded main body panel.

DETAILED DESCRIPTION

The present invention involves a barbecue grill cover assembly. As shown in FIG. 1, an exemplary embodiment of the grill cover 1 preferably comprises several component panels which are joined together to form the grill cover. The main body 2 of the grill cover is preferably rectangular. A plan view of the main body panel 2 is shown unfolded in FIG. 5. Attached on each end of the main body 2 is a generally tapered, triangular left side portion 3 and a similar right side portion 4. Plan views of the left and right panels 3 and 4 are shown in FIGS. 4A and 4B. Attached to the peripheral ends of the left side portion 3 and right side portion 4 is a left end panel 5 and a right end panel 6, respectively. Plan views of the left and right end panels 5 and 6 are shown in FIGS. 2A and 2B. The end panels 5, 6 are preferably rectangular.

The left end panel 5 may comprise a fastening strap 7. The strap 7 may comprise a fastener material such as a hook and loop fastening material (e.g. VELCRO) or the like. In the alternative, the strap 7 may be provided with a buckle, buttons, snaps or other suitable fastening means. Attached to the lower edge of the left end panel 8 is a generally rectangular pocket piece 9. FIG. 3 shows a plan view of the pocket piece 9 unfolded. A lateral edge 12 of the pocket piece 9 is attached to the bottom edge of the left end panel 8. The pocket piece 9 is also preferably attached to the left side portion 3 along the proximal 10 and distal edges 11 of the pocket piece. The medial edge 13 of the pocket piece 9 is preferably attached to a dowel 14 which runs along the length of the medial edge 13 of the pocket piece 9. The pocket piece 9 also preferably comprises a strap 15 which includes appropriate fastening means for fastening to the strap 7. The strap 15 preferably attaches near the medial edge 13 of the pocket piece 9. The pocket piece when not in use as a pocket, fits snugly under the side table of a grill to properly position the grill cover on the grill.

In addition, a strap 16 may be attached to the grill cover preferably near the left end panel 5. The strap 16 may be used to hang the grill cover when it is not in use.

The right side cover portion 4 preferably comprises a strap 17, which is preferably elastic. One end of the elastic strap 17 attaches to the front side of the cover portion 4, proximate to the main body 2, while the other end of the elastic strap 17 attaches to the back side of the cover portion 4, proximate to the main body 2. In the alternative, one end of the strap 17 may be attached to the front of the main body 2, proximate to the right side portion 4, while the other end of the elastic strap 17 is attached to the back side of the main body 2, proximate to the right side portion 4.

When the cover 1 installed on a grill, the main body portion 2 covers the main grill body (not shown), whereas the left and right portions 3 and 4 cover left and right horizontal side panels of the grill. The dowel 14 and the elastic strap 17 are seated under the side panels of the grill, thereby anchoring the cover 1 to the grill. The cover 1 is removed from the grill by pulling the elastic strap 17 over the outer edge of the grill's right side panel, thereby freeing the cover from the grill. In accordance with the present invention, the cover can then be folded into itself. The exemplary configuration disclosed allows the right side portion 4 and main body 2 to fold into the space formed by the left side portion 3, the left end panel 5, the pocket piece 9, and the dowel 14. Once the cover is folded into the aforementioned space, the straps 7 and 15 may be joined, resulting in a compact and easily manageable package. The compact folded cover may be stored on a grill tool holder, hook, nail or similar structure using the hanging strap 16. Alternatively, the compact folded cover may be stored under the grill.

To re-cover the grill, the user simply reverses the above-described steps. The pocket piece 9 and the elastic strap 17 then are placed under the left and right sides of a barbecue grill, securing the grill cover 1 to the grill.

The grill cover 1 is preferably comprised of a UV protective urethane-coated rip-stop polyester material. Alternative materials, however, may be used such as nylon or other materials which provide suitable weather protection. The panels may be stitched together using a french-seam. The seams are double-sewn to provide strength and waterproofing.

While several preferred embodiments of a barbecue grill cover 1 have been specifically described herein, it is to be understood that variations may be made in the barbecue grill cover 1 without departing from the spirit and scope of the invention as defined by the appended claims. In particular, the above-described grill cover 1 may be used to cover a conventional grill having two side panels. A person of ordinary skill in the art will understand, however, that this grill cover 1 can be adapted to cover grills having other configurations.

What is claimed is:

1. A grill cover adapted to cover a grill, the grill cover comprising:
   a generally rectangular main body adapted to cover a central portion of the grill;
   a left side portion, attached to a left edge of the main body and adapted to cover a left portion of the grill, wherein the left side portion comprises a substantially rectangular upper surface, a front tapered surface and a rear tapered surface, the front and rear tapered surfaces being substantially vertical;
   a right side portion, attached to a right edge of the main body and adapted to cover a right portion of the grill, wherein the right side portion comprises a substantially rectangular upper surface, a front tapered surface and a rear tapered surface, the front and rear tapered surfaces being substantially vertical, and wherein the right side portion comprises an open bottom;
   a generally rectangular pocket piece attached to the left side portion, the pocket piece being attached to a bottom of the left side portion;
   a pocket area having a set of walls, the walls comprising the pocket piece and the left side portion, wherein the grill cover can be folded and enclosed in the pocket area; and
   a first strap, wherein the first strap is attached between a front side of the grill cover and a rear side of the grill cover.

2. The grill cover of claim 1, wherein the grill cover comprises a one-piece fabric structure.

3. The grill cover of claim 2, wherein the fabric structure comprises UV protective material.

4. The grill cover of claim 3, wherein the UV protective material includes urethane-coated polyester.

5. The grill cover of claim 3, wherein the UV protective material includes rip-stop polyester.

6. The grill cover of claim 1, comprising a left end panel and a right end panel, wherein the left end panel is attached to the left side portion and to the pocket piece, and wherein the right end panel is attached to the right side portion.

7. The grill cover of claim 6, comprising a dowel, wherein the dowel is attached to a medial edge of the pocket piece.

8. The grill cover of claim 1, wherein a second strap is attached to the pocket piece.

9. The grill cover of claim 6, wherein a third strap is attached to the left end panel.

10. The grill cover of claim 1, comprising a hanging strap.

11. The grill cover of claim 10, wherein the hanging strap is attached to at least one of the left side portion, the pocket piece, and the left end panel.

12. The grill cover of claim 1, wherein the first strap comprises an elastic strap, and wherein one end of the elastic strap attaches to the front tapered surface of the right side portion and the other end of the elastic strap attaches to the rear tapered surface of the right side portion.

13. The grill cover of claim 1, wherein the first strap comprises an elastic strap, and wherein one end of the elastic strap attaches to a front side of the main body and the other end of the elastic strap attaches to a rear side of the main body.

\* \* \* \* \*